United States Patent [19]

Petzi

[11] Patent Number: 4,490,108
[45] Date of Patent: Dec. 25, 1984

[54] PROCESS FOR REDUCING THE OXYGEN CONTENT OF THE ATMOSPHERE IN A HEAT TREATMENT FURNACE AND HEAT TREATMENT FURNACE FOR CARRYING OUT THIS PROCESS

[75] Inventor: Fritz Petzi, Nuremberg, Fed. Rep. of Germany

[73] Assignee: Ludwig Riedhammer GmbH & Co. KG, Nuremberg, Fed. Rep. of Germany

[21] Appl. No.: 475,060

[22] Filed: Mar. 14, 1983

[30] Foreign Application Priority Data

Mar. 26, 1982 [DE] Fed. Rep. of Germany ....... 3211247
Jun. 26, 1982 [DE] Fed. Rep. of Germany ....... 3223954

[51] Int. Cl.$^3$ .......................... F27B 9/04; F27B 3/22; F27B 9/40; F27B 5/04
[52] U.S. Cl. ..................................... 432/23; 432/26; 432/37; 432/198
[58] Field of Search ...................... 432/23, 26, 37, 198

[56] References Cited

U.S. PATENT DOCUMENTS

| | | | |
|---|---|---|---|
| 3,227,782 | 1/1966 | Gie et al. | 432/23 |
| 3,884,621 | 5/1975 | Summer | 432/37 |
| 4,391,585 | 7/1983 | Riley et al. | 432/23 |
| 4,406,618 | 9/1983 | Maeyama | 432/23 |

Primary Examiner—John J. Camby
Attorney, Agent, or Firm—Spencer & Frank

[57] ABSTRACT

A process for reducing the oxygen content of the atmosphere in a heat treatment furnace for ceramic materials to a prescribed value comprises measuring the $O_2$ content of the furnace atmosphere at the point in the furnace to be affected and introducing fuel gas into the furnace as a function of the measurement result in such quantities that the desired oxygen content is attained. Also described is a furnace design suitable for carrying out this process.

11 Claims, 3 Drawing Figures

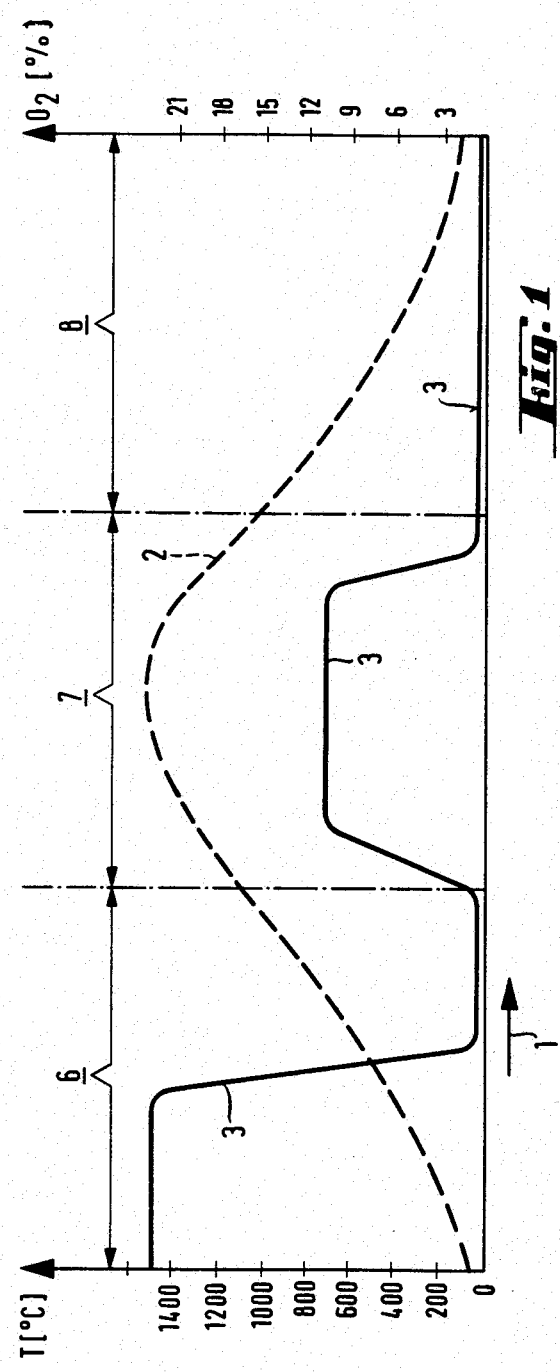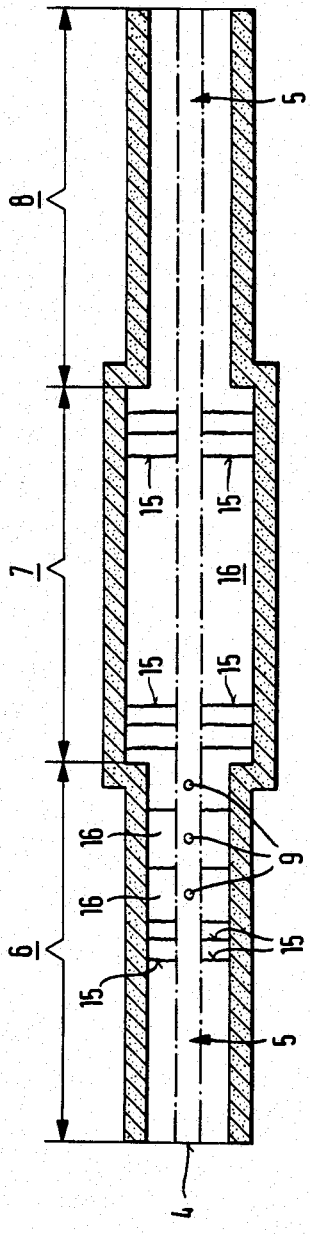

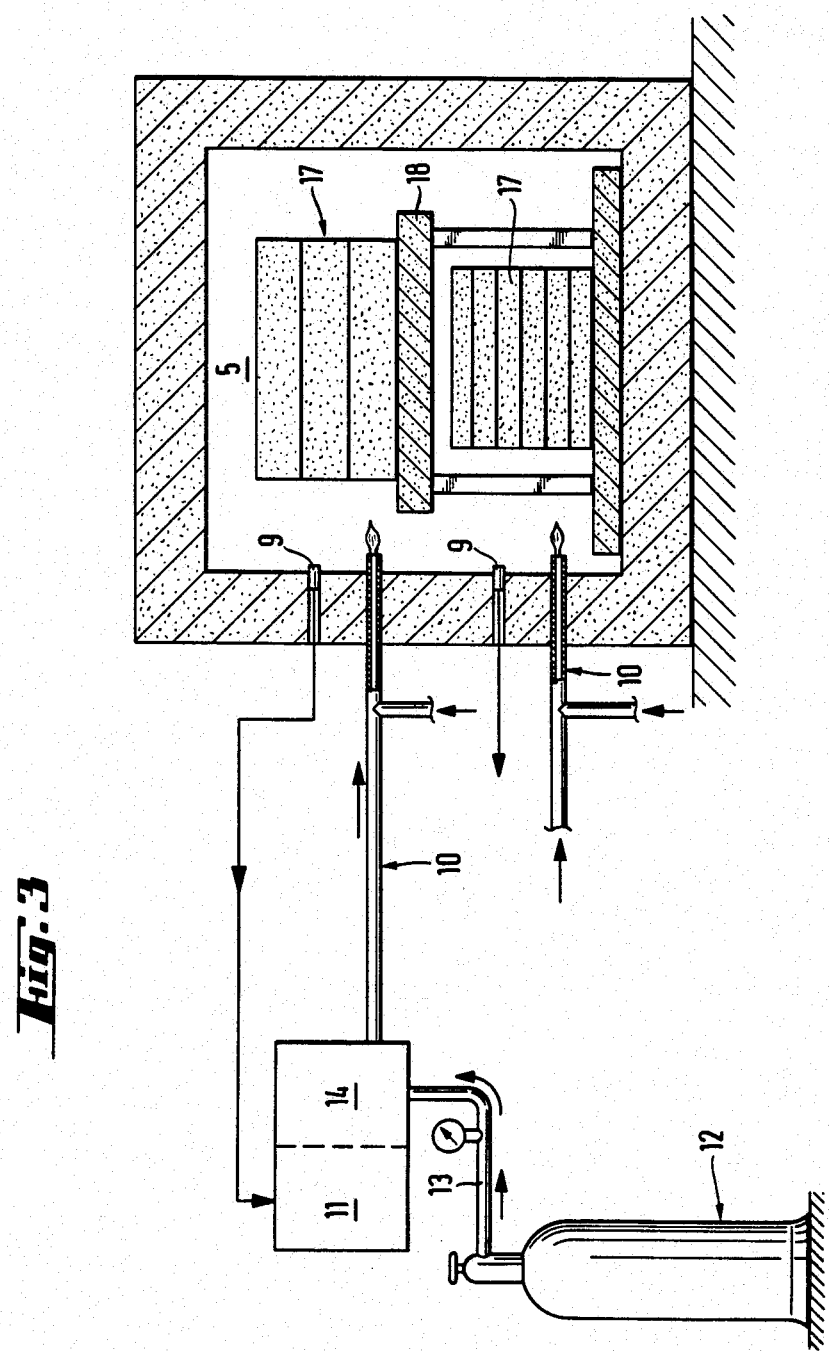

4,490,108

PROCESS FOR REDUCING THE OXYGEN CONTENT OF THE ATMOSPHERE IN A HEAT TREATMENT FURNACE AND HEAT TREATMENT FURNACE FOR CARRYING OUT THIS PROCESS

BACKGROUND OF THE INVENTION

The invention concerns a process for reducing the oxygen content of the atmosphere in a heat treatment furnace for ceramic materials, preferably soft-magnetic ferrites, to a prescribed value and a furnace for carrying out this process.

Heat treatment furnaces for the heat treatment of ceramic materials are known in the form of continuous heat treatment furnaces or batch operating furnaces. If materials of conventional composition, such as porcelain and similar materials, are burnt in these furnaces, no problems worth mentioning occur in matching the composition of the furnace atmosphere to the chemical nature of the charge material. Many of these materials have to be heat treated in an oxidizing atmosphere; in this case, a definite quantity of air or oxygen is added to the furnace atmosphere. Other charge materials require neutral or reducing atmospheres and, in this case also, there is no difficulty in adjusting the furnace atmosphere correspondingly.

For use in the electronics field, in particular, increasing use is made of ferrites, that is ferro-spinels, which, in addition to $Fe_2O_3$, also contain other metal oxides, for example zinc oxide, nickel oxide, manganese oxide and the like.

The soft-magnetic zinc/manganese ferrites, in particular, have the property of releasing oxygen in substantial quantities when heated and thus altering the composition of the furnace atmosphere. Since, on the other hand, the magnetic properties of the materials depend to a substantial extent on the composition of the heat treatment atmosphere, it is precisely this "outgassing" of oxygen from the heat treatment charge which provides substantial technical difficulties.

Similar heat treatment behavior is exhibited by bodies made of pure $Fe_2O_3$, which, as is known, are converted at increased temperatures into $Fe_3O_4$, the so-called magnetite, giving off oxygen in the process. In this case also, the furnace atmosphere is thus enriched in oxygen during the heat treatment process.

It would be fundamentally possible to dilute the outgassing oxygen from the heat treatment charge by an increased supply of nitrogen sufficiently large to obviate the damaging effects of the oxygen. The quantity of nitrogen necessary for this purpose, however, would be so large that it would critically disturb the temperature balance of the furnace so that additional measures would have to be taken in order to heat the necessary quantity of nitrogen to the temperature existing in the introduction zone before introducing it into the furnace. Furnaces equipped in this manner must, in consequence, be provided with additional burners and recuperative chambers and they demand a substantially increased fuel requirement.

SUMMARY OF THE INVENTION

The object of the invention is to improve the known heat treatment furnaces, both continuous furnaces and batch-operating furnaces, which are basically suitable for the burning of oxygen-releasing ceramic materials, particularly ferrites, in such a way that by using them, the oxygen content of the furnace atmosphere can be reduced to a given prescribed value and, in particular, even when the charge material outgasses oxygen.

In order to achieve this object, it is proposed that the oxygen content of the furnace atmosphere be measured at the furnace position to be affected and a preferably hydrogen-containing fuel gas be introduced into the furnace as a function of the measurement result in such quantities that the desired oxygen content is attained.

For the measurement, preferably continuous measurement, of the oxygen content, one or more sensors are installed in the furnace, as is basically known in furnaces for the burning of ceramic bodies, for example from applicant's German Patent Specification No. 3,016,852, corresponding to U.S. Pat. No. 4,365,954. Such sensors protrude into the furnace channel and they are associated with corresponding indication, registration and, if necessary, control devices outside the furnace. In the area of the sensor probes, a fuel gas supply line is now, according to the invention, to lead into the furnace channel, and at least one of the fuel gases mentioned is introduced through it into the furnace channel.

Hydrogen-containing gases are preferably used as fuel gases although carbon monoxide would also be basically suitable. In the case of carbon monoxide, however, it should be borne in mind that this reacts with oxygen to form carbon dioxide, a gas which, in turn, is dissociated at the furnace temperatures involved here to a substantial extent into oxygen and carbon monoxide, corresponding to the Boudouard equilibrium. It is more favourable to use hydrogen-containing gases, for which such a dissociation equilibrium of the combustion product "water" does indeed exist, but for which the equilibrium lies far on the water side. The hydrogen content can be present in a mixture with other gases, as is the case in the so-called "lighting gas" (mixture of carbon monoxide and hydrogen) or the hydrogen content can be chemically combined with other materials, as, for example, in methane, propane, butane and similar known fuel gases. The introduction of a separate fuel gas proposed here is completely independent of the furnace heating and exclusively serves the objective of chemically binding the oxygen present in the furnace atmosphere by reaction with it. The measure proposed can be carried out with both fuel-heated and electrically heated furnaces.

In a preferred embodiment of the heat treatment furnace according to the invention, the measurement probe is associated with a controller which adjusts the quantity of combustion gas introduced through the fuel gas supply line in the furnace channel as a function of a required value to be prescribed. If the heat treatment furnace concerned is a continuous heat treatment furnace, it is advantageous if the furnace channel is subdivided into several chambers by means of verticaly disposed screens, each of these chambers having at least one oxygen measurement probe and at least one combustion gas supply line. In a furnace equipped in this manner, it is possible to adjust the oxygen content separately over the furnace length in each of the chambers screened from one another by the vertical screens, so that the shape of an "oxygen curve" can be followed, this curve extending over the length of the continuous furnace with any given curve shape.

It is advantageous if the fuel gas supply line emerges in the vicinity of the furnace charge, preferably in the lower part of the furnace channel. In arranging the position of the entry points, attention must be paid to the fact that the oxygen content to be eliminated originates preferentially from the furnace charge itself so that it is advantageous to arrange the fuel gas supply in its vicinity. The oxygen sensor or sensors are then preferably arranged somewhat above this point so that the value obtained by them has already been evened out by diffusion within the furnace atmosphere. The latter statement applies irrespective of the type of furnace, i.e. both for continuous furnaces and for batch operated heat treatment furnaces.

It can also be advantageous if several oxygen sensors are distributed over the furnace cross-section and if each sensor is associated with its own emergence point in a fuel gas supply line. If control equipment is used for the automatic metering of the fuel gas, each measurement sensor and each oxygen supply line or entry will also, in this case, be associated with its own controller or at least its own controller duct.

BRIEF DESCRIPTION OF THE DRAWINGS

The invention is described in more detail below using the attached drawings, in which:

FIG. 1 shows a schematic diagram, which indicates the temperature distribution and the oxygen distribution over the length of a continuous heat treatment furnace;

FIG. 2 is a schematic longitudinal section through a continuous heat treatment furnace;

FIG. 3 is a schematic cross-section through a continuous heat treatment furnace in accordance with FIG. 2 with associated controller for the fuel gas supply (shown enlarged relative to FIG. 2).

DETAILED DESCRIPTION OF THE INVENTION

In the diagram of FIG. 1, the length of a continuous furnace is plotted initially schematically on the horizontally drawn axis. The throughput direction corresponds to the arrow 1.

The temperature of the heat treatment channel is given on the left-hand vertical axis; the temperature curve is indicated by 2 in the diagram.

The oxygen content ($O_2$ content) of the furnace atmosphere in % is given on the right-hand vertical axis, the variation of this content in the furnace atmosphere being given by the curve 3 ($O_2$ curve).

A longitudinal section through a continuous heat treatment furnace is shown schematically in FIG. 2. Since the length of this furnace is drawn the same length as the horizontal axis of the diagram in FIG. 1, the two figures can be associated directly with one another.

The charge to be heat-treated enters the furnace flue 5 at the furnace entry 4. The temperature curve 2 in FIG. 1 shows how the temperature increases with the extent of the movement of the charge through the furnace. When moving through the furnace, the charge first passes the heating zone 6, then arrives in the sintering zone 7 and finally at the cooling zone 8. At the end, the charge leaves the furnace again with a temperature of approximately 100° C. or less.

If the furnace charge is, for example, soft-magnetic zinc/manganese ferrite, strong outgassing of oxygen from the charge bodies occurs even in the heating zone 6, particularly in the last third. However, the magnetic properties of the furnace charge demand that there should be a strongly reduced oxygen concentration in the furnace atmosphere precisely in this area, as shown by FIG. 1. In order to make this possible, several oxygen measurement probes 9, as shown in FIG. 3, are introduced into the furnace in the furnace channel area in the example given. A fuel gas supply line 10, independent of heating gas supplies possibly present, leads to the area of each of the measurement probes. The measurement probes monitor the actual oxygen content of the furnace atmosphere continuously at each of the points and transmit the measured value to the controller 11. The controller compares the measured value with the required value set in it, determines the required quantity of combustion gas by means of the known chemical reaction equation between oxygen and the fuel gas used in each case, and this fuel gas quantity is additionally introduced into the furnace channel in order that the oxygen content should be reduced from the given value to the desired value. FIG. 3 also shows, in schematic fashion, a gas cylinder 12 which leads via a supply line 13 into the metering device 14 integrated with the controller 11. The representation of the gas cylinder 12 is, of course, only intended symbolically; depending on local conditions and the quantity of additional gas to be used, this can also be taken from a gas line. Cases in which the additional combustion gas is taken from a cylinder or a tank are, however, not rare because the composition of the additional fuel gas must be known most accurately for purposes of exact metering.

FIG. 2 shows that several vertically disposed screens 15 are installed in the furnace channel in the area of the heating zone 6, and these subdivide the furnace channel over the length considered into several individual chambers 16. The arrangement of such screens (often called "diffusion screens") is known, for example from U.S. Pat. No. 4,365,954. The screens, in association with the present invention, have the object of subdividing the furnace channel into substantially closed individual spaces in which there is a controllable gas flow, so that the desired oxygen curve can be maintained very precisely. At those points in the furnace channel at which the $O_2$ content alters particularly strongly, several vertical screens are installed in series in order to avoid too strong a mixing of the sections of the furnace atmosphere adjacent to one another in that region. By this means, it is possible to attain strong variations in the $O_2$ content such as are shown in FIG. 1.

FIG. 1 also shows that the desired oxygen concentration in the area of the sinter zone 7 is again at a higher level and remains constant over a fairly long stretch. It is not necessary to subdivide the furnace into many small individual chambers in this constant section. It is, however, advantageous to arrange such chambers in those length sections in which the oxygen concentration changes, such, for example, as at the beginning and ending of the sintering zone 7, where a relatively steep rise and fall of the oxygen concentration curve has to be run through.

FIG. 3 shows that the furnace charge 17 can be arranged on racks 18, it being stacked in several levels for better utilisation of the furnace channel. In such cases, it can be advantageous if the fuel gas supply line emerges in the vicinity of the furnace charge, preferably in the lower region of the furnace channel, in order to bring the fuel gas to those points which are preferentially supplied with outgassed oxygen. Consideration should also be given to the fact that the introduction of fuel gas in the lower part of the furnace leads to a welcome gas convection inside the furnace channel of furnace chambers, with the result that a rapid mixing of the gases occurs in this space, thus ensuring that the desired oxygen concentration is attained substantially homogeneously over the cross-section. It can also be advantageous if several oxygen sensors are distributed over the furnace cross-section and if each sensor is associated with its own entry of a fuel gas supply line, as is indicated schematically in FIG. 3.

I claim:

1. Method for reducing the oxygen content of the atmoshere of a heat treatment furnace for cermaic materials which release oxygen on heating at a particular location in the furnace to be at or below a predetermined reference value, comprising measuring the $O_2$ content of the furnace atmosphere at that particular location with an $O_2$ sensing means, and introducing fuel gas into the furnace according to the $O_2$ content measured, said fuel gas being introduced in regulated quantities separate from the furnace fuel stream until the oxygen content is measured as being at or below the given reference value, whereby the $O_2$ in excess of the reference value is combined with said fuel gas in an oxidation reaction.

2. Process as defined in claim 1 wherein the fuel gas is a hydrogen-containing fuel gas.

3. Process as defined in claim 1, wherein the ceramic material is a soft magnetic ferrite.

4. Heat treatment furnace for ceramic material comprising a furnace channel in which the oxygen content of the atmosphere is controlled to be at or below a predetermined reference value at particular locations, at least one oxygen measuring probe being disposed at a particular location in the interior of the furnace channel which measures the $O_2$ content at that location and compares it with said reference value, a regulator fuctionally connected to said probe which controls the quantity of a fuel gas introduced into the furnace channel through a fuel gas intake to the quantity necessary for reducing excess oxygen at the particular location in excess of the reference value.

5. Heat treatment furnace as defined in claim 4, wherein the fuel gas intake is disposed as a separate conduit which penetrates into the furnace channel in the region of the measuring probe.

6. The heat treatment furnace as claimed in claim 4, wherein the furnace flue is subdivided, by means of vertically disposed screens into several chambers, each of which has at least one oxygen measurement probe and at least one fuel gas supply line.

7. The heat treatment furnace as claimed in claim 4, wherein the fuel gas supply line emerges into the furnace flue in the vicinity of the furnace charge.

8. The heat treatment furnace as claimed in claim 7, wherein the fuel gas supply line emerges into the furnace in the lower region of the furnace.

9. The heat treatment furnace as claimed in claim 4, wherein there are several oxygen sensors distributed over the furnace cross-section and each sensor is associated with its own entry of a combustion gas supply line.

10. The heat treatment furnace as claimed in claim 4, wherein the furnace is a continuous heat treatment furnace.

11. The heat treatment furnace as claimed in claim 4, wherein the furnace is a batch operating heat-treatment furnace.

* * * * *